United States Patent
Bankole et al.

(10) Patent No.: US 9,417,870 B2
(45) Date of Patent: Aug. 16, 2016

(54) MANAGING USER ACCESS TO ALTERNATIVE VERSIONS OF A PARTICULAR FUNCTION OF A SOFTWARE PRODUCT FROM WITHIN A CURRENT VERSION OF THE SOFTWARE PRODUCT

(71) Applicant: INTERNATIONAL BUSINESS MACHINES CORPORATION, Armonk, NY (US)

(72) Inventors: Kalonji K. Bankole, San Jose, CA (US); Gregory J. Boss, Saginaw, MI (US); Sachin K. Mahajan, Pune (IN); John E. Moore, Jr., Brownsburg, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/564,049

(22) Filed: Dec. 8, 2014

(65) Prior Publication Data
US 2016/0162286 A1  Jun. 9, 2016

(51) Int. Cl.
G06F 9/44 (2006.01)
G06F 9/445 (2006.01)

(52) U.S. Cl.
CPC ... *G06F 8/71* (2013.01); *G06F 8/65* (2013.01)

(58) Field of Classification Search
CPC .................................... G06F 8/71; G06F 8/65
USPC ....................................................... 717/170
See application file for complete search history.

(56) References Cited

U.S. PATENT DOCUMENTS

| | | | | |
|---|---|---|---|---|
| 5,301,280 A | * | 4/1994 | Schwartz | H04L 29/06 709/237 |
| 7,689,563 B1 | * | 3/2010 | Jacobson | G06Q 10/107 707/663 |

(Continued)

FOREIGN PATENT DOCUMENTS

EP    2390784 A1    11/2011

OTHER PUBLICATIONS

"System and Method of applying metadata-driven customizations in SaaS multi-tenant environment", IPCOM000234014D, accessed via ip.com, electronic publication Jan. 7, 2014, 4 pages.

*Primary Examiner* — Philip Wang
*Assistant Examiner* — Zengpu Wei
(74) *Attorney, Agent, or Firm* — Amy J. Pattillo

(57) ABSTRACT

For a software product delivered as a hosted service from a host, the host delivers, to a single user interface, a current version of the software product comprising one or more selectable functions of the current version of the software product, wherein the current version of the software product is one version of multiple separate versions of the software product. The host updates the single user interface to display at least one selectable previous version function from at least one previous version of the separate versions of the software product. In response to receiving a user selection within the single user interface to access a particular selectable previous version function, the host delivers the functionality of the particular selectable previous version function from a particular previous version of the software product within the single user interface for the current version of the software product.

17 Claims, 11 Drawing Sheets

(56) References Cited

U.S. PATENT DOCUMENTS

| | | |
|---|---|---|
| 8,521,777 B2 | 8/2013 | Nuggehalli et al. |
| 8,925,092 B1 * | 12/2014 | Johansson ........... H04L 63/1433 |
| | | 726/25 |
| 2004/0193914 A1 * | 9/2004 | Chih-Wei .............. G06F 21/121 |
| | | 726/27 |
| 2004/0255291 A1 | 12/2004 | Sierer et al. |
| 2009/0249296 A1 * | 10/2009 | Haenel ...................... G06F 8/61 |
| | | 717/120 |
| 2010/0082813 A1 * | 4/2010 | Li .......................... H04L 67/16 |
| | | 709/226 |
| 2011/0296380 A1 * | 12/2011 | Dvinov .................... G06F 8/71 |
| | | 717/122 |
| 2012/0192079 A1 * | 7/2012 | Burk ..................... G06F 3/0481 |
| | | 715/740 |
| 2013/0246932 A1 | 9/2013 | Zaveri et al. |
| 2014/0164315 A1 * | 6/2014 | Golshan ........... G06F 17/30011 |
| | | 707/608 |
| 2014/0173588 A1 | 6/2014 | Ko |
| 2014/0181177 A1 | 6/2014 | Barnreuther et al. |
| 2014/0245290 A1 * | 8/2014 | Gupta ....................... G06F 8/61 |
| | | 717/178 |
| 2015/0135333 A1 * | 5/2015 | Biswas ................. H04L 63/102 |
| | | 726/28 |

* cited by examiner

MANAGING USER ACCESS TO ALTERNATIVE VERSIONS OF A PARTICULAR FUNCTION OF A SOFTWARE PRODUCT FROM WITHIN A CURRENT VERSION OF THE SOFTWARE PRODUCT

TECHNICAL FIELD

The embodiment of the invention relates generally to managing software product upgrades and particularly to managing user access to alternative versions of a particular function of a software product from within a current version of the software product.

DESCRIPTION OF THE RELATED ART

Software developer often provide updates to software product releases that change or remove one or more functions of the software product. Each software update of a software product may be referred to as a version of the software product. When a software developer updates a software product, a user accessing a current version of the software product may need the functionality of one or more alternative versions of one or more functions of the software product from previous versions of the software product.

BRIEF SUMMARY

There are instances when a software product is updated and the updated version of the software product changes one or more functions of the software product by adjusting or removing a previous version of the one or more functions from one or more previous version of the software product. There is a need for a method, system, and computer program product for providing the user with access to one or more alternative versions of a function, from a previous version of the software product, within the current version of the software product.

In one embodiment, a method for managing a software product is directed to delivering, to a single user interface of a thin client, for a software product delivered as a hosted service by a host, a current version of the software product comprising one or more selectable functions of the current version of the software product, wherein the current version of the software product is one version of multiple separate versions of the software product. The method is directed, for each of the one or more selectable functions of the current version of the software product displayed in the single user interface, to determining, using the one or more processors, whether one or more previous versions of the one or more selectable functions are available in one or more previous versions of the software product from among the plurality of separate versions of the software product. The method is directed, for each of the one or more selectable functions for which one or more previous versions are available, to determining, using the one or more processors, if a user accessing the single user interface is allowed to use each of the one or more previous versions. The method is directed, in response to determining the user accessing the single user interface is allowed to use at least one version of the one or more previous versions, to updating the single user interface to display at least one selectable previous version function for each of the one or more selectable functions for the at least one version of the one or more previous versions that the user is allowed to use The method is directed, for each of the one or more selectable functions for the at least one version of the one or more previous versions, to determining, using the one or more processors, whether each of the at least one of the one or more previous versions is installed for user access at the thin client. The method is directed, in response to determining a particular version of the one or more previous versions is not installed for user access at the thin client, to adjusting, using the one or more processors, the single user interface to graphically distinguish a selection of the at least one selectable previous version function for the particular version to indicate that the particular version is not installed from a second selection of the at least one selectable previous version function that is installed. The method is directed to, in response to receiving a user selection within the single user interface to access a particular selectable previous version function from among the at least one selectable previous version function, delivering the functionality of the particular selectable previous version function from a particular previous version of the software product within the single user interface for the current version of the software product.

In another embodiment, a system for managing a software product comprises a processor, coupled with a memory. The processor is configured to perform the actions of delivering, to a single user interface of a thin client, for a software product delivered as a hosted service by a host, a current version of the software product comprising one or more selectable functions of the current version of the software product, wherein the current version of the software product is one version of multiple separate versions of the software product. The processor is configured to perform the actions, for each of the one or more selectable functions of the current version of the software product displayed in the single user interface, determining whether one or more previous versions of the one or more selectable functions are available in one or more previous versions of the software product from among the plurality of separate versions of the software product. The processor is configured to perform the actions, for each of the one or more selectable functions for which one or more previous versions are available, of determining if a user accessing the single user interface is allowed to use each of the one or more previous versions. The processor is configured, in response to determining the user accessing the single user interface is allowed to use at least one version of the one or more previous versions, to perform the actions of updating the single user interface to display at least one selectable previous version function for each of the one or more selectable functions for the at least one version of the one or more previous versions that the user is allowed to use The processor is configured to perform the actions, for each of the one or more selectable functions for the at least one version of the one or more previous versions, of determining whether each of the at least one of the one or more previous versions is installed for user access at the thin client. The processor is configured to perform the actions, in response to determining a particular version of the one or more previous versions is not installed for user access at the thin client, of adjusting the single user interface to graphically distinguish a selection of the at least one selectable previous version function for the particular version to indicate that the particular version is not installed from a second selection of the at least one selectable previous version function that is installed. The processor is configured to perform the actions of, in response to receiving a user selection within the single user interface to access a particular selectable previous version function from among the at least one selectable previous version function, delivering the functionality of the particular selectable previous version function from a particular previous version of the software product within the single user interface for the current version of the software product.

In another embodiment, a computer program product for managing a software product comprises a non-transitory computer readable storage medium having program instructions embodied therewith. The program instructions are executable by a processor to cause the processor to deliver, to a single user interface of a thin client, for a software product delivered as a hosted service by a host, a current version of the software product comprising one or more selectable functions of the current version of the software product, wherein the current version of the software product is one version of a plurality of separate versions of the software product. The program instructions are executable by a processor to cause the processor to, for each of the one or more selectable functions of the current version of the software product displayed in the single user interface, determine whether one or more previous versions of the one or more selectable functions are available in one or more previous versions of the software product from among the plurality of separate versions of the software product. The program instructions are executable by a processor to cause the processor to, for each of the one or more selectable functions for which one or more previous versions are available, determine if a user accessing the single user interface is allowed to use each of the one or more previous versions. The program instructions are executable by a processor to cause the processor to, in response to determining the user accessing the single user interface is allowed to use at least one version of the one or more previous versions, update the single user interface to display at least one selectable previous version function for each of the one or more selectable functions for the at least one version of the one or more previous versions that the user is allowed to use The program instructions are executable by a processor to cause the processor to, for each of the one or more selectable functions for the at least one version of the one or more previous versions, determine whether each of the at least one of the one or more previous versions is installed for user access at the thin client. The program instructions are executable by a processor to cause the processor to, in response to determining a particular version of the one or more previous versions is not installed for user access at the thin client adjust the sin le user interface to graphically distinguish a selection of the at least one selectable previous version function for the particular version to indicate that the particular version is not installed from a second selection of the at least one selectable previous version function that is installed. The program instructions are executable by a processor to cause the processor to, in response to receiving a user selection within the single user interface to access a particular selectable previous version function from among the at least one selectable previous version function, deliver the functionality of the particular selectable previous version function from a particular previous version of the software product within the single user interface for the current version of the software product.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
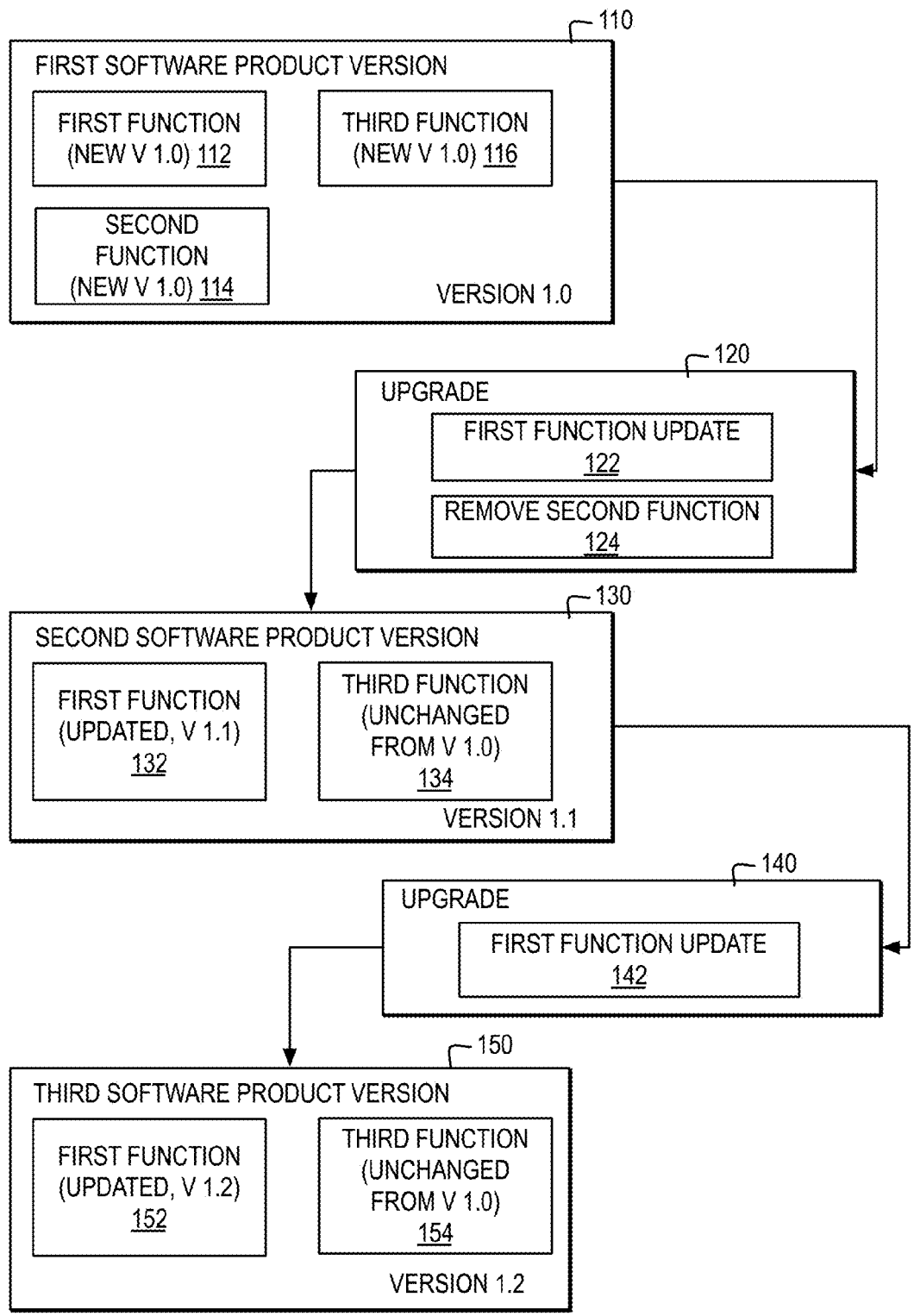
FIG. 1 illustrates one example of block diagram of multiple versions of a software product, where one or more functions are changed with each update to the software product.

FIG. 1 illustrates a block diagram of one example of multiple versions of a software product, where one or more functions are changed with each update to the software product.

In one example, a software product may be programmed with multiple functions. As illustrated in FIG. 1, for a particular software product, a first software product version 110, referred to as version 1.0 (v 1.0), includes multiple functions illustrated as first function (v 1.0) 112, second function (v 1.0) 114, and third function (v 1.0) 116. In additional or alternate embodiments, first software product version 110 may include additional or alternate numbers and types of functions.

In one example, a software product with multiple functions may be upgraded or improved, where with each upgrade, one or more of the functions are adjusted. In one example, each state of the software product upon upgrade may be referred to as a version of the software product. In one example, each version of the software product may be distinguished by a unique version identifier including, but not limited to, a unique version name and a unique version number, to identify each unique state of the software product. Version identifiers may be used to keep track of incrementally different versions of the software product.

In one example, when software developers work on upgrades to released software products, the software developers may add new functional capabilities, adjust existing functions, and remove functions. In one example, new functionality or improvements to existing functions may provide users of a software product with reasons to upgrade their own instance of the software product when upgrades are available. In addition, in one example, improvements to existing functions or removal of existing functions, to correct errors or bugs, may provide users of a software product with reasons to upgrade their own instance of the software product when upgrades are available. One of ordinary skill in the art will appreciate that there may be additional or alternate reasons for a particular upgrade of a software product.

In one example, an upgrade 120 is applied to first software product version 110 to provide a second software product version 130 of the software product, referred to as version 1.1 (v 1.1). In one example, upgrade 120 includes an instruction for a first function update 122 and an instruction to remove second function 124. In one example, when first function update 122 is applied to first software product version 110, first function (new v 1.0) 112 in first software product version 110 is updated in second product version 130 as first function (updated, v 1.1) 132. In one example, when remove second function 124 is applied to first software product version 110, second function (new v. 1.0) 114 in first software product version 110 is removed from the software product in second software product version 130. In one example, a third function (unchanged from v 1.0) 134 in second software product version 130 is unchanged from third function (v 1.0) 116 from first software product version 110.

In one example, an upgrade 140 is applied to second software product version 130 to provide a third software product version 150 of the software product, referred to as version 1.2 (v 1.2). In one example, upgrade 140 includes an instruction for a first function update 142. In one example, when first function update 142 is applied to second software product version 130, first function (updated, v 1.1) 132 in second software product version 130 is updated in third software product version 150 as first function (updated, v 1.2) 152. In one example, a third function (unchanged from v 1.0) 154 in third software product version 150 is unchanged from third function (new v 1.0) 116.

In one example, a user that initially accesses first software product version 110, when upgrade 120 is made available, may select to upgrade to second software product version 130. In one example, once the user starts using second software product version 130, the user may need the functionality of second function (new v 1.0) 114, which was available in first software product version 110, but which has been removed from second software product version 130. In another example, once the user starts using second software product version 130, the user may need the functionality of first function (new v. 1.0) 112, before the function was updated to first function (updated v 1.1) 132. Similarly, the user accessing second software product version 130, when upgrade 140 is made available, may select to upgrade to third software product version 150. In one example, once the user starts using third software product version 130, the user may need the functionality of first function (updated v 1.1) 132, before the function was updated to first function (updated v 1.2) 152. In addition, the user of third software product version 150 may also need the functionality of second function (new v 1.0) 114 or the functionality of first function (new v. 1.0) 112.

In one example, once a user accesses an upgraded version of a software product, for the user to access functions or instances of functions only available in previous versions of the software product, in one example, the user may have the option to access and open an instance of the upgraded version of the software product and also separately access and open an instance of the previous version of the software product. The user may run a file through the instance of the upgraded version of the software product to access the version of functions in the upgraded version of the software product, and then switch to the instance of the previous version of the software product and run the file through the previous version of the software product to access alternative versions of functions only available in the previous version of the software product. Maintaining different versions of a same product, however, requires additional computing resources for each software version and is time-consuming, requiring time to set up multiple versions of a software product and requiring the user to keep track of which version of the program the user needs to have open to use a particular function.

In one example, according to an embodiment of the present invention, instead of requiring a user to maintain a separate copy of each version of a software product for a user to have access to the software product, a software product may be delivered to a user specified with selectable accessibility to previous versions of functions from previous versions of a software product, which are available to the current user from within the current version of a software product. In one example, to ensure compatibility and security when determining whether to deliver a previous version of a function from a previous version of a software product, within a current version of a software product, metadata may be added to each functional element of each version of a software product to enable a determination of whether there are any compatibility or security issues for a current user interface or current operating system to expose a previous version of a function.

Figure 2:
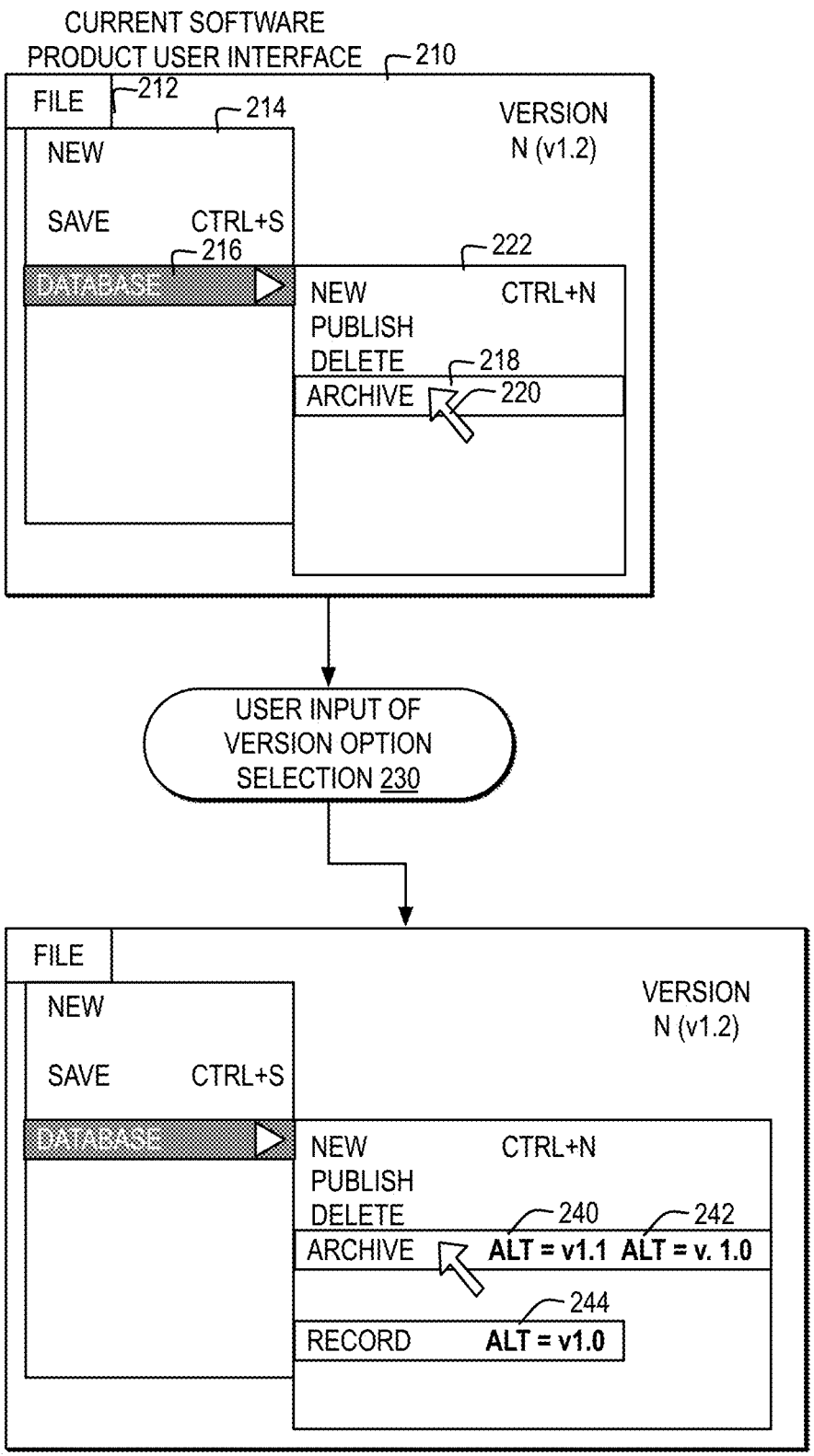
FIG. 2 illustrates one example of a block diagram of a single, unified user interface for a current version of a software product, through which a user is enabled to access alternative versions of functions available only in previous versions of the software product.

FIG. 2 illustrates a block diagram of one example of a single, unified user interface for a current version of a software product, through which a user is enabled to access alternative versions of functions available only in previous versions of the software product.

In one example, a current software product user interface 210 represents a user interface for a particular version of a software product, for a software product that has multiple versions available. In one example, current software product user interface 210 may represent the Nth version of the software product, where N represents the total number of versions of the software product from the first version of the software product to the current version of the current software product. For example, current software product user interface 210 may represent third software product version 150 illustrated as version 1.2, where N=3.

In one example, current software product interface 210 provides an interface through which a user may select to access one or more functions available in the current version of the software product. In one example, a user may select one or more functions of the current version of the software product by selecting from among selectable function options displayed within one or more menus within current software product interface 210. In one example, a menu may include one or more headings, such as "file" 212, where through placement of a cursor 220 or through other inputs, a user may select to expand the menu heading. In one example, when a menu heading is selected, a drop down menu, such as drop down menu 214, may be displayed, where the drop down menu may include selectable functions and may include additional menu options, which when selected, trigger additional drop down menus. For example, a selectable function "new" and a selectable function "save" are illustrated in drop down menu 214 and an additional menu option "database" is illustrated in drop down menu 214. In one example, when a user selects additional menu option "database", as illustrated at reference numeral 216, an additional drop down menu 222 is displayed. In one example, additional drop down menu 222 includes multiple selectable functions illustrated as "new", "publish", "delete", and "archive".

In the example, the user has positioned cursor 220 over selectable function "archive", as illustrated at reference numeral 218. In the example, if the user enters a selection input, such as a mouse click, while cursor 220 is positioned over selectable function "archive", the selectable function of "archive" for current version 1.2 is triggered.

In the example, in addition to providing the user with an option to select a particular function of current version 1.2 of a software product, displayed within the drop down menus in current software product user interface 210, a user may enter another type of input to enable selectable access, from within current software product user interface 210, to one or more previous versions of functions available from previous versions of the software product. In one example, in response to a user input of a version option selection, as illustrated at reference numeral 230, current software product user interface 210 is updated to enable the user to access one or more previous versions of functions available from one or more previous versions of the software product. In one example, the version options election by a user may include one or more types of inputs including, but not limited to, one or more keystroke inputs, one or more voice inputs, and one or more tactile detectable inputs. In an additional or alternate embodiment, current software product user interface 210 may be automatically updated to enable the user to access one or more previous versions of functions available from one or more previous version of the software product, as the user selects to open menus or drop down menus, without the user enter a separate version option selection.

In one example, when a user inputs the version option selection as illustrated at reference numeral 230, while selecting the selectable function of "archive" within additional drop down menu 222, additional drop down menu 222 may be updated to include a selectable option for one or more previous versions of the "archive" function available from previous versions of the software product. In one example, when a user inputs a version option selection while placing a cursor over the "archive" function in additional drop down menu 222, additional drop down menu 222 may be updated to include selectable options for choosing the previous version of the function from previous versions of the software product illustrated by selection option "alt=v 1.1" at reference numeral 240 and a selection option "alt=v 1.0" at reference numeral 242. In one example, if the "archive" function represents the "first function" of FIG. 1, where version 1.0 includes first function (new v 1.0) 112, version 1.1 includes first function (updated v 1.1) 132, and version 1.2 includes first function (updated, v 1.2) 152, then original selectable archive function 218 may represent a selectable option for first function (updated, v 1.2) 152, "alt=v 1.1" at reference numeral 240 may represent a selectable option for first function (updated v 1.1) 132, and "alt=v 1.0" at reference numeral 242 may represent a selectable option for first function (new v 1.0) 112.

In one example, in addition to a user input of a version option selection triggering a version update to a particular selectable option selected by a user, a user input of a version option selection may trigger an update to enable access to other previous versions of other functions that were previously available within the currently open windows. In one example, other previous versions of other functions may include other previous versions of a function currently displayed within a currently open window and may include previous versions of functions that were available in the currently open window in a previous version of the software product only. In one example, when a user inputs a version option selection while additional drop down menu 222 is open, additional drop down menu 222 may be updated to include a selectable option for a previous "record" function available from version "alt=v 1.0", as illustrated at reference numeral 244, where the selectable "record" function represents second function (new v 1.0) 114, which is only available in version 1.0 of the software product.

Figure 3:
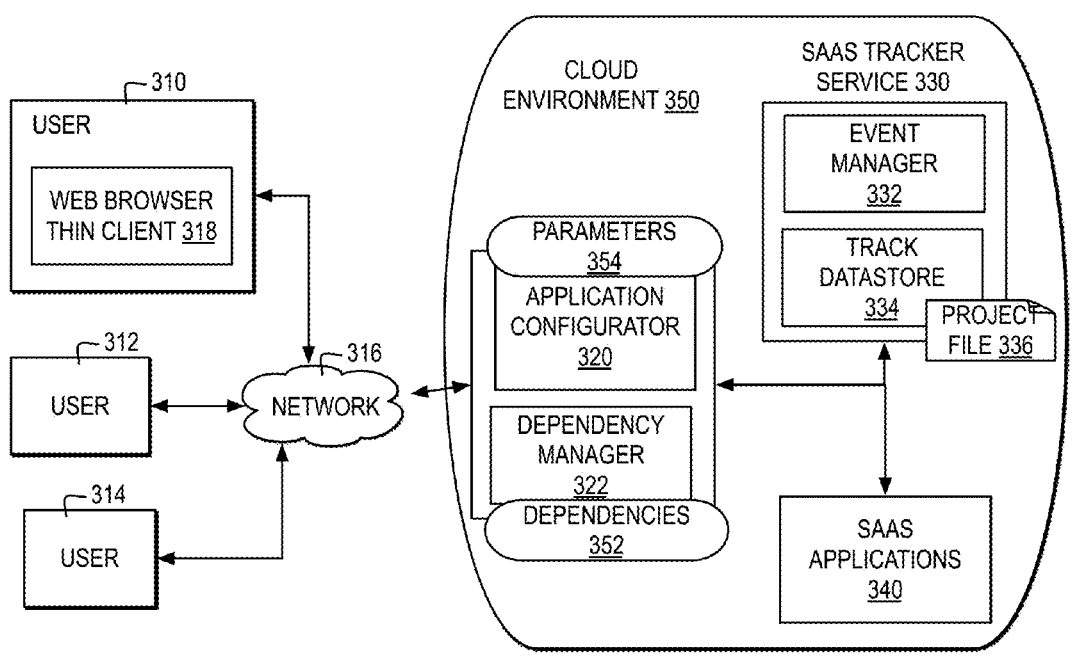
FIG. 3 illustrates one example of a block diagram of a software product, delivered as hosted service, such as software as a service (SaaS), for supporting delivery of one or more previous versions of functions available in a previous version of a software product, within a current version of the software product delivered to the user as a hosted service.

FIG. 3 illustrates a block diagram of one example of a software product, delivered as hosted service, such as software as a service (SaaS), for supporting delivery of one or more previous versions of functions available in a previous version of a software product, within a current version of the software product delivered to the user as a hosted service.

In one example, one or more users may access one or more software products delivered as hosted services over a network. In one example, software products delivered as hosted service may include, but is not limited to, Software as a Service (SaaS) applications, illustrated as SaaS applications 340. For example, user 310, user 312, and user 314 may access one or more of SaaS applications 340. In one example, SaaS applications 340 may represent software that is licensed and delivered to users as hosted services over a network on a subscription basis. SaaS applications 340 may be centrally hosted by a vendor or service provider on one or more server systems accessible to one or more users via network 116. SaaS applications 340 may be distributed to users through one or more protocol layers that support one or more types of network services. In additional or alternate embodiments, SaaS applications 340 may also include or represent applications distributed by an applications service provider or applications provided on demand.

In one example, a user may access SaaS applications 340 using one or more types of interfaces. In one example, user 310 accesses SaaS applications 340 through an interface of web browser thin client 318 representing a thin client running on a web browser of a user machine. In additional or alternate examples, software products may be delivered as hosted services to user through other types of interfaces.

In one example, SaaS applications 340 may include different versions of a software product, where each version is a separate version of the software product. Each user subscription to access a particular software product delivered by SaaS applications 340 may specify one or more versions of the software product that the user is subscribed to receive. In one example, SaaS applications 340 are delivered to each user according to the user's subscription, which may also specify which previous versions of a software product the user may have access to. In one example, a single host may host SaaS applications 340 for different users where the subscription for each user specifies the versions of the software product accessible to each particular user. In one example, by delivering an application to a user through SaaS applications 340, a system administrator that controls a set of subscription rights applied for accesses by multiple users may configure the set of subscription rights to access previous versions of functions within SaaS applications 340 with one configuration setting, without having to perform installations or upgrades on each individual system accessed by each of the users.

In one example, SaaS applications 340 may be accessible through network 316 within one or more types of network environments including, but not limited to, a cloud environment 350 for managing delivery of services to multiple users. Within cloud environment 350, one or more components may be implemented that support management and delivery of SaaS applications 340 to enable a user to select to access one or more alternative previous versions of functions available in a previous version of an SaaS application, through a user interface for a current version of the SaaS application. In one example, the one or more services for supporting management and delivery of SaaS applications 340 may include, but are not limited to, an application configurator 320, a dependency manager 322, and an SaaS tracker service 330, including an event manager 332 and a track datastore 334. In one example, the services for supporting management and delivery of SaaS applications 340 enable a user to select to access one or more previous version functions, available in a previous version of an SaaS application, from within a current version of the SaaS application, by merging the functionality of previous versions of a software package into a single, unified user interface of the current version of the software package. In addition, in one example, the services for supporting management and delivery of SaaS applications 340 enable a user to select to access one or more previous version functions, available in a previous version of an SaaS application, from within a current version of the SaaS application, without having to open separate instances of each version of the SaaS application and switch between versions to access functions from each version. In addition, by a user accessing a software product through a SaaS application delivered as a hosted service, the user is not required to download and install, or upgrade, any version of the software product on the user's system.

In one example, application configurator 320 provides a service for evaluating and passing one or more parameters 354 to SaaS applications 340 to enable the SaaS applications 340 to perform a previous version function. In one example, application configurator 320 may be pre-configured with one or more parameters 350 that need to be passed to a previous version function, where the one or more parameters are required for the previous version of the function to perform. In another example, application configurator 320 may include an evaluation function for evaluating one or more parameters 354 that need to be passed to a previous version function, where the one or more parameters are required for the previous version of the function to perform. For example, for an "archive" function, which accumulates one or more types of data records over a period of time, such as the archive function referred to at reference numeral 218, a previous version of the archive functionality may require one or more parameters including, but not limited to, a compression algorithm, an archiving policy, and an indexing mechanism. In one example, one or more parameters 354 may be change dependent upon the version of the archive functionality that is accessed. In addition, in one example, one or more parameters 354 may be static or may be dynamic and sent in response to each request for the parameters. In one example, an administrator may set one or more parameters 354, which are then required for older versions of a function to work properly. In another example, a user may set one or more parameters and the user selected parameters may be stored as parameters 354 or may be stored on a user machine.

In one example, dependency manager 322 provides a service for detecting dependencies 352 on application assets that are required by each version of a function of an SaaS application. In one example, application assets may include, but are not limited to, libraries, security policies, state requirements, and data schemas. In one example, for every version of a function throughout multiple versions of an SaaS application, there may be a corresponding compatible selection of application assets that need to be managed and mapped out based on the particular version of the functions the user is expected to invoke. In one example, an administrator or a software designer may set one or more dependencies 352, which specify application assets that are required by each version of a function. In one example, dependency manager 322 determines whether the application assets required by dependencies 352 are present on the user machine running web browser thin client 318. In one example, if the application assets are not present, the user is prompted to select to download only those application assets from dependencies 352 that are required for running a previous version function.

In one example, SaaS tracker service 300 may provide a service for determining which alternative previous version functions of an SaaS application are available for use by the user of a current version of the SaaS application and storing the determination in a track datastore 334. In one example, SaaS tracker service 300 determines, based on track datastore 334, which functions of a current version of an SaaS application have multiple versions and of those versions, which are already installed for a user to access through the current version of the SaaS application. In one example, SaaS tracker service 300 may direct that any version of a function that is shown in a user interface for a current version of the SaaS application, but not available for use by the user, may be graphically distinguished to alert the user that the version of the function is not available to the user. SaaS tracker service 300 may direct that if a user attempts to select a version of a function that the user does not already have available, that the user be provided with an option to download and install the previous version of the function onto the host system for the user's subscription, for use by the SaaS application.

In one example, SaaS tracker service 300 may also provide an event manager 332 service for automatically tagging and labeling content for an SaaS application. In one example, each tag may specify which function, and which version of the function, has modified content through an SaaS application. In one example, when a user creates a new project in an SaaS application, a project file, such as project file 336, may be created in track datastore 334 to keep track of function versions for the project. In one example, each time a user executes a particular function, event manager 332 may tag the output of the function in the file created for the project in track datastore 334 with one or more labels including, but not limited to, the function's name and version of the function. SaaS tracker service 300 may also enable a user to view the tagged information so that the user may easily keep track of which version of a function was used to produce a particular output.

In additional or alternate embodiments, cloud environment 350 may include additional or alternate services for enabling user access to alternative previous versions of functions of a software product from within an single user interface for a currently accessed version of a software product delivered as a hosted service of one of SaaS applications 340.

In one example, parameters 354, dependencies 352, and project file 336 may represent examples of metadata added to a configuration of an SaaS application within cloud environment 350. In one example, one or more types of metadata may be specified for an SaaS application in cloud environment 350 to specify compatibility and security requirements for accessing a previous version function within a current version of a software product accessed as a SaaS application. In additional or alternate embodiments, additional or alternate types of metadata may be collected and specified within could environment 350 for performing one or more of specifying compatibility and security requirements, tracking which versions of functions are selected by a user, and performing other types of functions.

Figure 4:
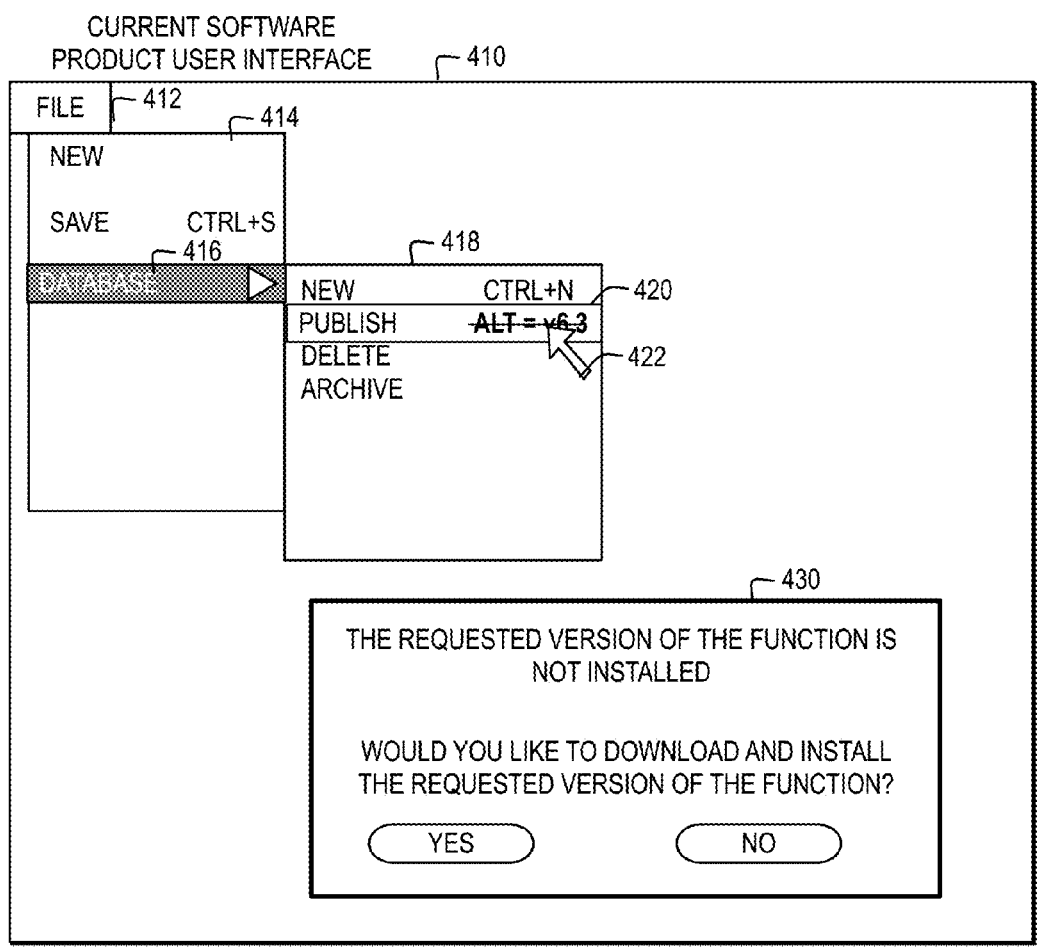
FIG. 4 illustrates one example of a block diagram of a single, unified user interface for a current version of a software product, through which a user is enabled to access alternative versions of functions available only in previous versions of the software product, where a user attempting to access alternative versions may be prompted with additional options.

FIG. 4 illustrates a block diagram of one example of a single, unified user interface for a current version of a software product, through which a user is enabled to access alternative versions of functions available only in previous versions of the software product, where a user attempting to access alternative versions may be prompted with additional options.

In one example, a current software product user interface 410 represents a user interface for a particular version of a software product, for a software product that has multiple versions available. In one example, current software product interface 410 provides an interface through which a user may select to access one or more functions available in the current version of the software product. In one example, a user may select one or more functions of the current version of the software product by selecting from among selectable function options displayed within one or more menus within current software product interface 410. In one example, a menu may include one or more headings, such as "file" 412, where through placement of a cursor 422 or through other inputs, a user may select to expand the menu heading. In one example, when a menu heading is selected, a drop down menu, such as drop down menu 414, may be displayed, where the drop down menu may include selectable functions and may include additional menu options, which when selected, trigger additional drop down menus. For example, a selectable function "new" and a selectable function "save" are illustrated in drop down menu 414 and an additional menu option "database" is illustrated in drop down menu 414. In one example, when a user selects additional menu option "database", as illustrated at reference numeral 416, an additional drop down menu 418 is displayed. In one example, additional drop down menu 418 includes multiple selectable functions illustrated as "new", "publish", "delete", and "archive".

In the example, the user has positioned cursor 422 over selectable function "publish", as illustrated at reference numeral 420. In the example, the selectable function "publish" is displayed with a selectable alternative version of the function from a previous version of the software product, illustrated as "alt=v.6.3". In the example, while the alternative version "alt=v 6.3" is an alternative version of the function "publish", it is not yet installed for use by the user. In on example, to graphically illustrate that the alternative version of the function is not yet installed for use by the user, the selectable alternative version is graphically struck through.

In the example, if the user enters a selection input, such as a mouse click, while cursor 422 is positioned over the alternative version of the selectable function "publish", an additional interface window 430 may be triggered and displayed, prompting a user with an option to download and install the requested version of the function. In one example, if a user selects the "yes" option within additional interface window 430, the alternative version of the function may effectively be downloaded and installed by adding the alternative version of the function to the user's SaaS subscription and triggering one or more of the SaaS services to download and install the alternative version for control by the SaaS application delivered to the user.

It is understood in advance that although this disclosure includes a detailed description of an implementation within a cloud computing environment, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
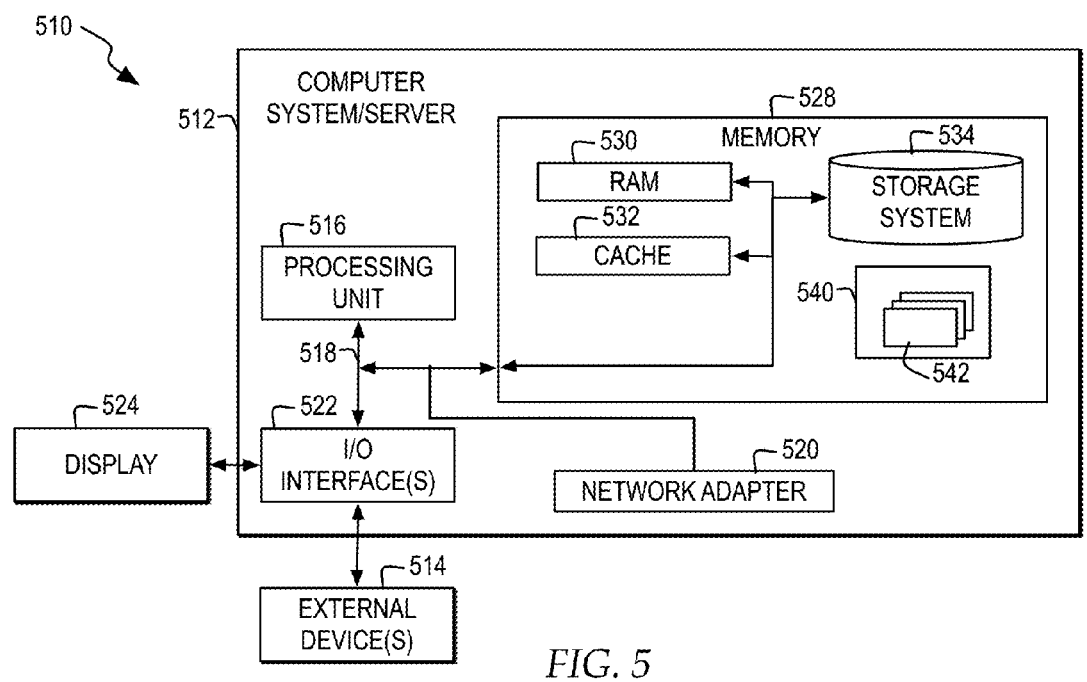
FIG. 5 illustrates one example of a block diagram of a cloud computing node, which may be implemented in a cloud computing environment.

Referring now to FIG. 5, FIG. 5 illustrates one example of a block diagram of a cloud computing node, which may be implemented in a cloud computing environment. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 30 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
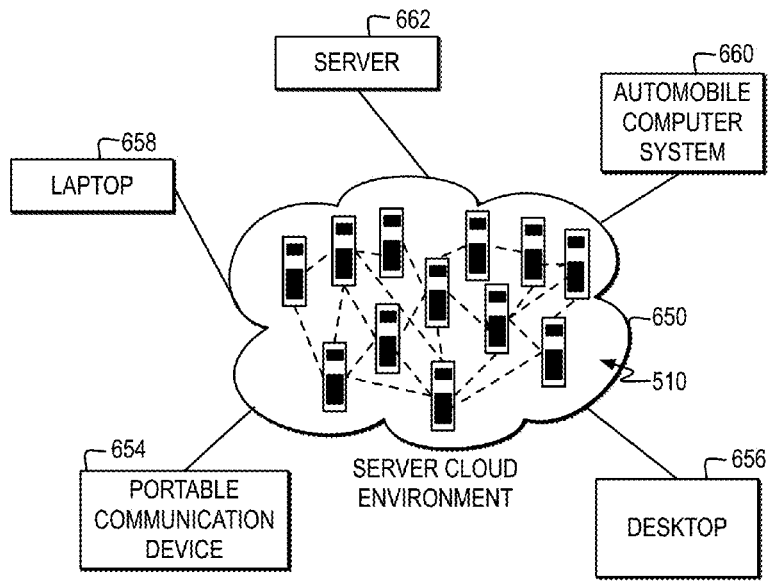
FIG. 6 illustrates one example of a block diagram of a cloud computing environment.

FIG. 6 illustrates a block diagram of one example of a cloud computing environment. In one example, a cloud computing environment 650 is representative of cloud environment 350. As shown, cloud computing environment 650 comprises one or more cloud computing nodes 510 with which local computing devices used by cloud consumers, such as, for example, personal communication device 654, which may include, but is not limited to, a personal digital assistant (PDA) or cellular telephone, a desktop computer 656, a laptop computer 658, automobile computer system 660, and server 662 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices shown in FIG. 6 are intended to be illustrative only and that computing nodes 510 and cloud computing environment 650 can communicate with any type of computerized device over any type of network and/or network addressable connection (e.g., using a web browser).

Figure 7:
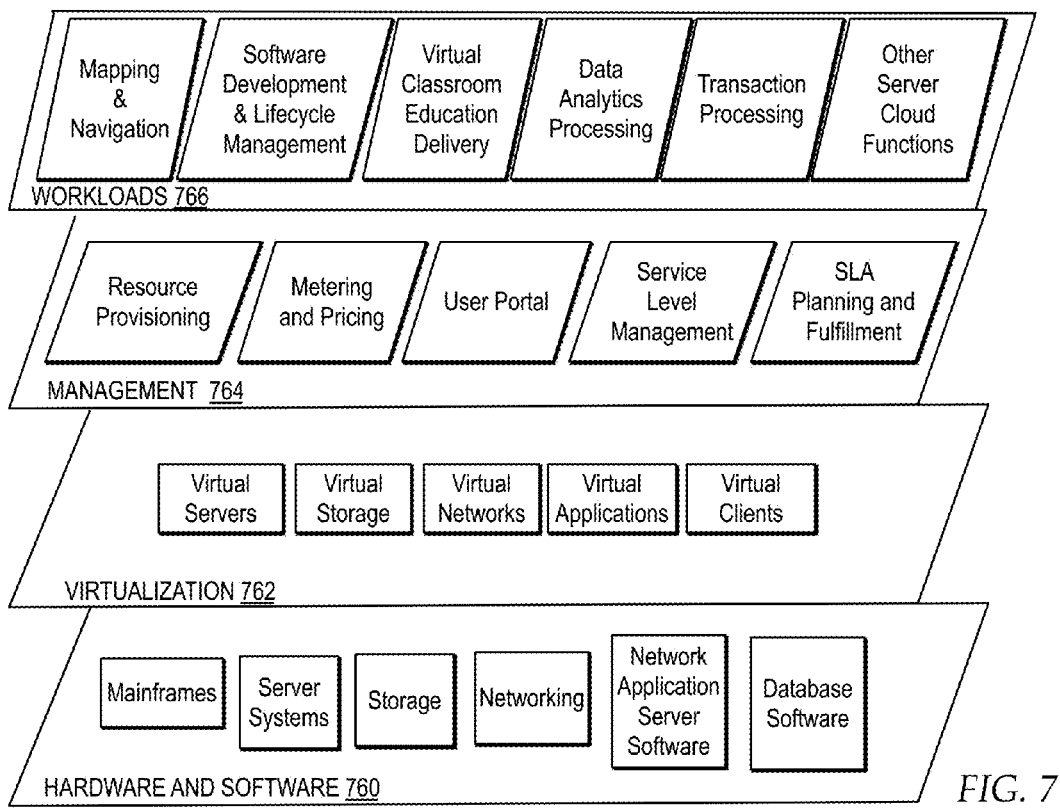
FIG. 7 illustrates one example of a block diagram of a set of functional abstraction layers provided by a cloud computing environment.

FIG. 7 illustrates a block diagram of one example of a set of functional abstraction layers provided by a cloud computing environment. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide one or more functions including, but not limited to, resource provisions, metering and pricing, user portal, security, service level management, and SLA planning and fulfillment. Resource provisioning may provide dynamic procurement of computing resources and other resources that are utilized to perform tasks within the cloud computing environment. Metering and Pricing may provide cost tracking as resources are utilized within the cloud computing environment, and billing or invoicing for consumption of these resources. In one example, these resources may comprise application software licenses. Security may provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which cloud computing environment 650 may be utilized. Examples of workloads and functions which may be provided from this layer may include, but are not limited to: mapping and navigation; software development and lifecycle management; virtual classroom education delivery; data analytics processing; transaction processing; and other server cloud functions. In one example, the other server cloud functions may include, but are not limited to, providing one or more of the functions for managing user access to alternative versions of a particular function of a software product from within a current version of the software product. Other server cloud functions may include one or more of the functions of application configurator 320, dependency manager 322, SaaS tracker server 330, and SaaS applications 340.

Figure 8:
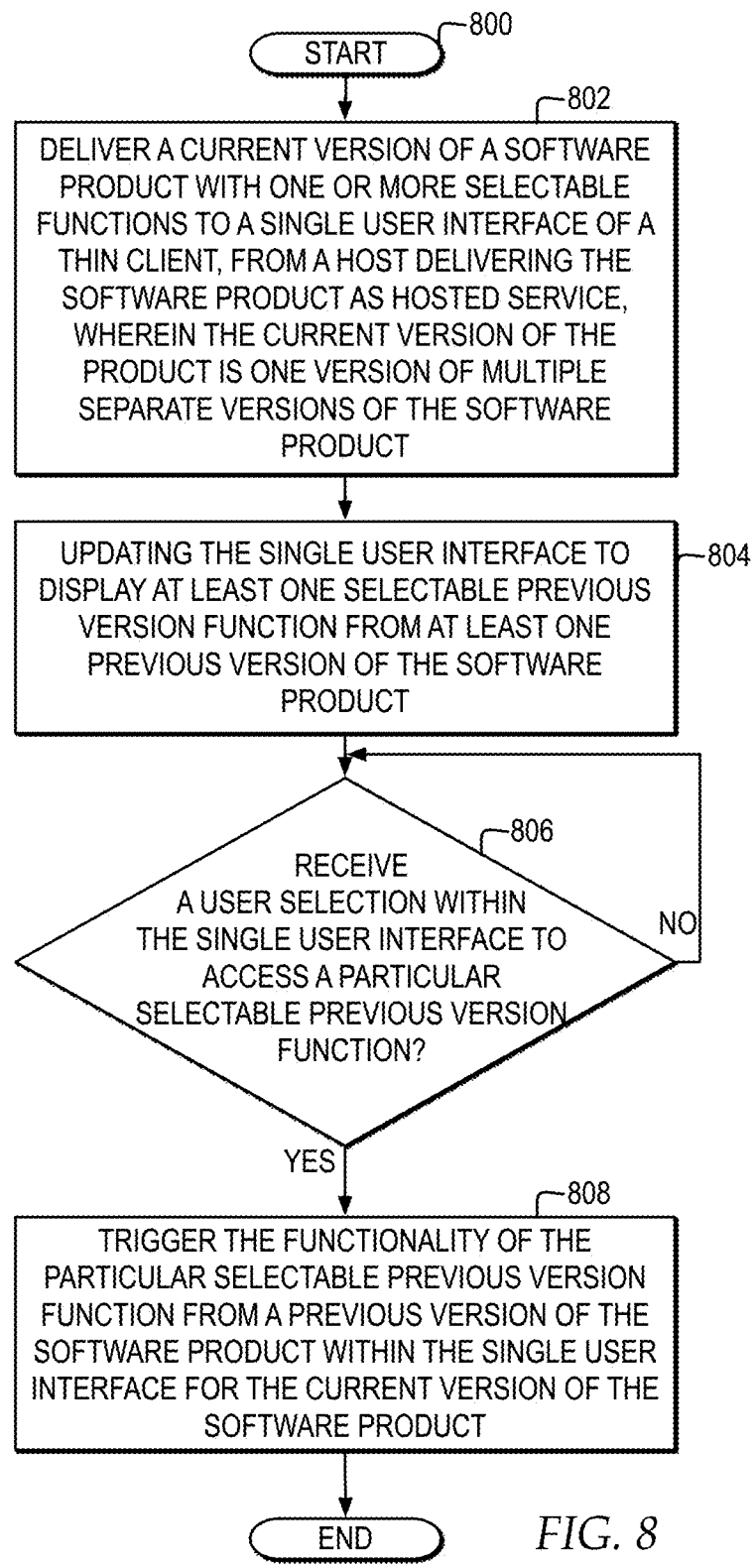
FIG. 8 illustrates a high level logic flowchart of a process and computer program for managing user access to alternative versions of a particular function of a software product from within a current version of the software product.

FIG. 8 illustrates a high level logic flowchart of a process and computer program for managing user access to alternative versions of a particular function of a software product from within a current version of the software product.

In one example, the process and program starts at block 800 and thereafter proceeds to block 802. Block 802 illustrates delivering a current version of a software product with one or more selectable functions to a single user interface of a thin client, from a host delivering the software product as a hosted service, such as a software as a service application, wherein the current version of the product is one version of a plurality of separate versions of the software product. Next, block 804 illustrates updating the single user interface to display at least one selectable previous version function from at least one previous version of the software product. Thereafter, block 806 illustrates a determination whether a user selection within the single user interface to access a particular selectable previous version function is received. At block 806, if a user selection is received, then the process passes to block 808. Block 808 illustrates triggering the functionality of the particular selectable previous version function from a previous version of the software product within the single user interface for the current version of the software product.

Figure 9:
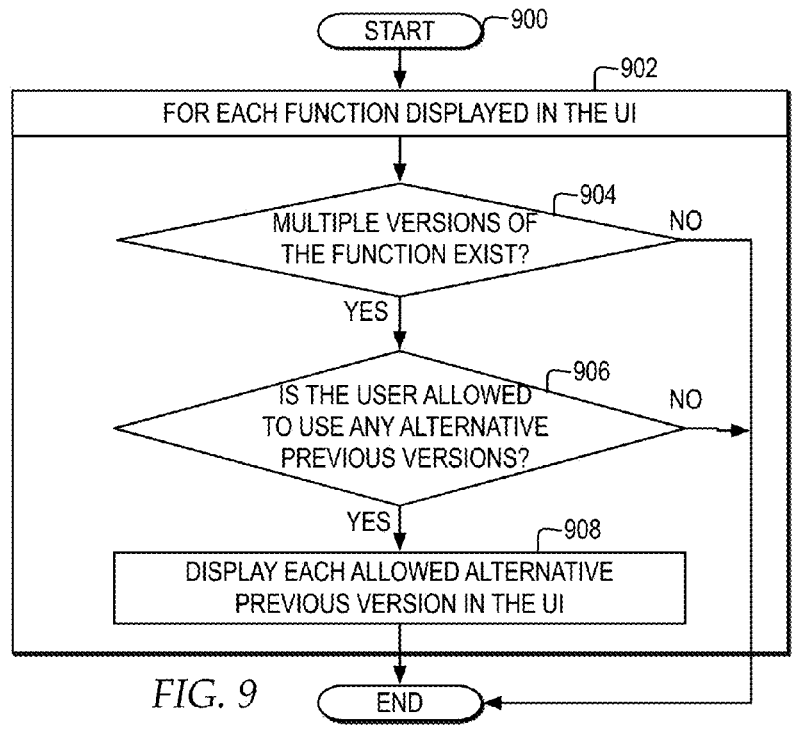
FIG. 9 illustrates a high level logic flowchart of a process and computer program for managing an application configurator service for evaluating the alternative previous version of functions available to a user for functions displayed within a user interface (UI) of a current version of a software product.

FIG. 9 illustrates a high level logic flowchart of a process and computer program for managing an application configurator service for evaluating the alternative previous version of functions available to a user for functions displayed within a UI of a current version of a software product.

In one example, the process and program starts at block 900 and thereafter proceeds to block 902. Block 902 illustrates that the process of block 904, block 906, and block 908 may be performed for each function displayed in a UI. In one example, block 904 illustrates a determination whether multiple versions of the function exist. At block 904, if multiple versions of the function do not exist, then the process, for the function, ends. At block 904, if multiple versions of the function exist, then the process passes to block 906. Block 906 illustrates a determination whether a user is allowed to use any of the previous versions of the function. In one example, a user's SaaS subscription may specify whether the user is allowed to use any previous versions of the function. At block 906, if a user is not allowed to use any of the previous versions of the function, then the process ends. At block 906, if the user is allowed to use any of the previous versions of the function, then the process passes to block 908. Block 908 illustrates displaying each alternative previous version of a function the user is allowed to use, in the UI, and the process ends.

Figure 10:
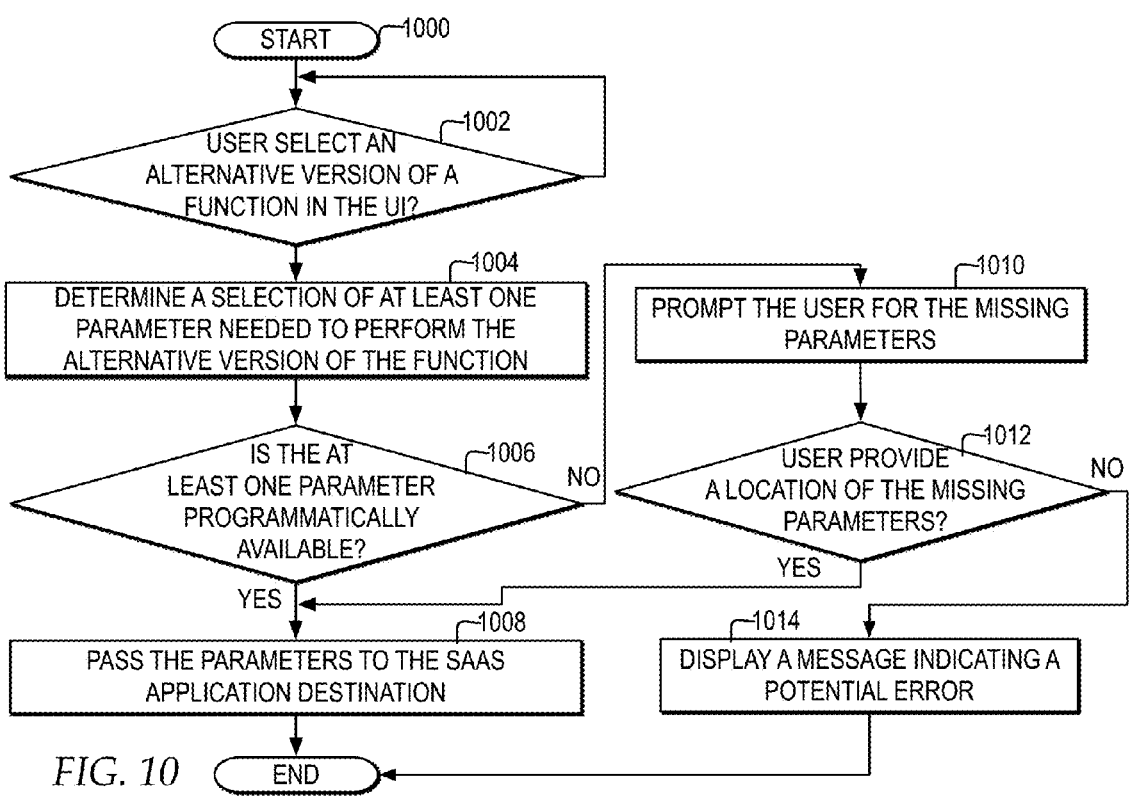
FIG. 10 illustrates a high level logic flowchart of a process and computer program for managing an application configurator service for determining any parameters required for running alternative versions of function in a UI of a current version of the software product and passing the parameters to the SaaS application destination for the current version of the software product.

FIG. 10 illustrates a high level logic flowchart of a process and computer program for managing an application configurator service for determining any parameters required for running alternative versions of function in a UI of a current version of the software product and passing the parameters to the SaaS application destination for the current version of the software product.

In one example, the process and program starts at block 1000 and thereafter proceeds to block 1002. Block 1002 illustrates a determination of whether a user selects an alternative version of a function displayed in the UI. At block 1002, if a user selects an alternative version of a function displayed in the UI, then the process passes to block 1004. Block 1004 illustrates determining a selection of at least one parameter needed to perform the alternative version of the function. Next, block 1006 illustrates a determination whether the at least one parameter is programmatically available. At block 1006, if the at least one parameter is programmatically available, then the process passes to block 1008. Block 1008 illustrates passing the parameters to the SaaS application destination, and the process ends. Returning to block 1006, at block 1006, if the at least one parameter is not programmatically available, then the process passes to block 1010. Block 1010 illustrates prompting the user to supply the missing parameters. Next, block 1012 illustrates a determination whether the user supplies the missing parameters. At block 1012, if the user does not provide the location of the missing parameters, then the process passes to block 1014. Block 1014 illustrates displaying a message indicating a potential error, and the process ends. Returning to block 1012, if the user does provide the location of the missing parameters, then the process passes to block 1008. As previously described, block 1008 illustrates passing the parameters to the SaaS application destination, and the process ends.

Figure 11:
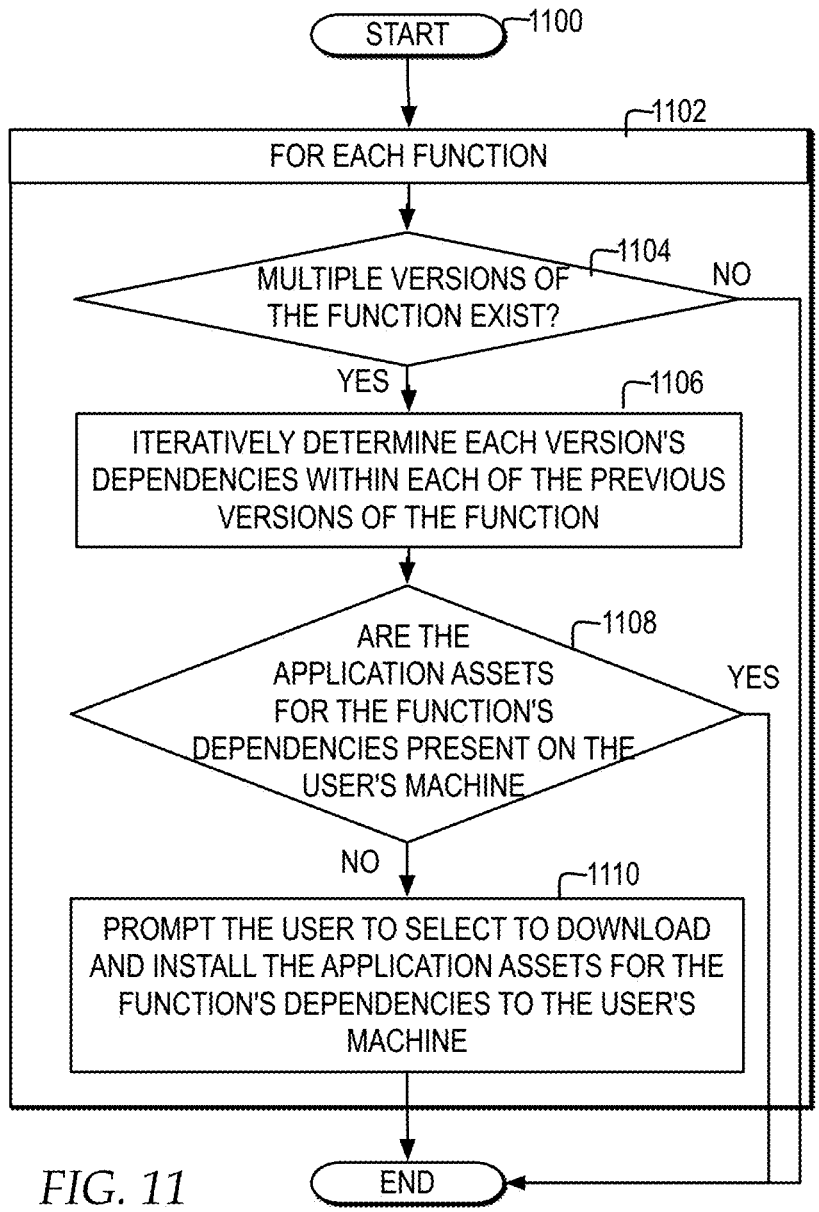
FIG. 11 illustrates a high level logic flowchart of a process and computer program for a dependency manager service to detect dependencies from existing application assets for alternative previous versions of functions displayed within a UI of a current version of a software product.

FIG. 11 illustrates a high level logic flowchart of a process and computer program for a dependency manager service to detect dependencies from existing application assets for alternative previous versions of functions displayed within a UI of a current version of a software product.

In one example, the process and program starts at block 1100 and thereafter proceeds to block 1102. Block 1102 illustrates that the process of block 1104, block 1106, block 1108, and block 1110 may be performed for each function displayed in a UI. In one example, block 1104 illustrates a determination whether multiple versions of the function exist. At block 1104, if multiple versions of a function do not exist, then the process ends for the function. At block 1104, if multiple versions of a function do exist, then the process passes to block 1106. Block 1106 illustrates iteratively determining each version's dependencies within each of the alternative previous versions of the function. Next, block 1108 illustrates, for each of the dependencies identified, are a determination of whether the application assets for the dependencies are present on the user's machine. At block 1108, if the application assets for the function's dependencies are present on the user's machine, then the process ends for the function. At block 1108, if the application assets for the function's dependencies are not present on the user's machine, then the process passes to block 1110. Block 1110 illustrates prompting the user to download and install the application assets for the function's dependencies to the user's machine, where the user may select to download only those application assets required to run a version of a function to minimize the amount of machine disk space required, and the process ends.

Figure 12:
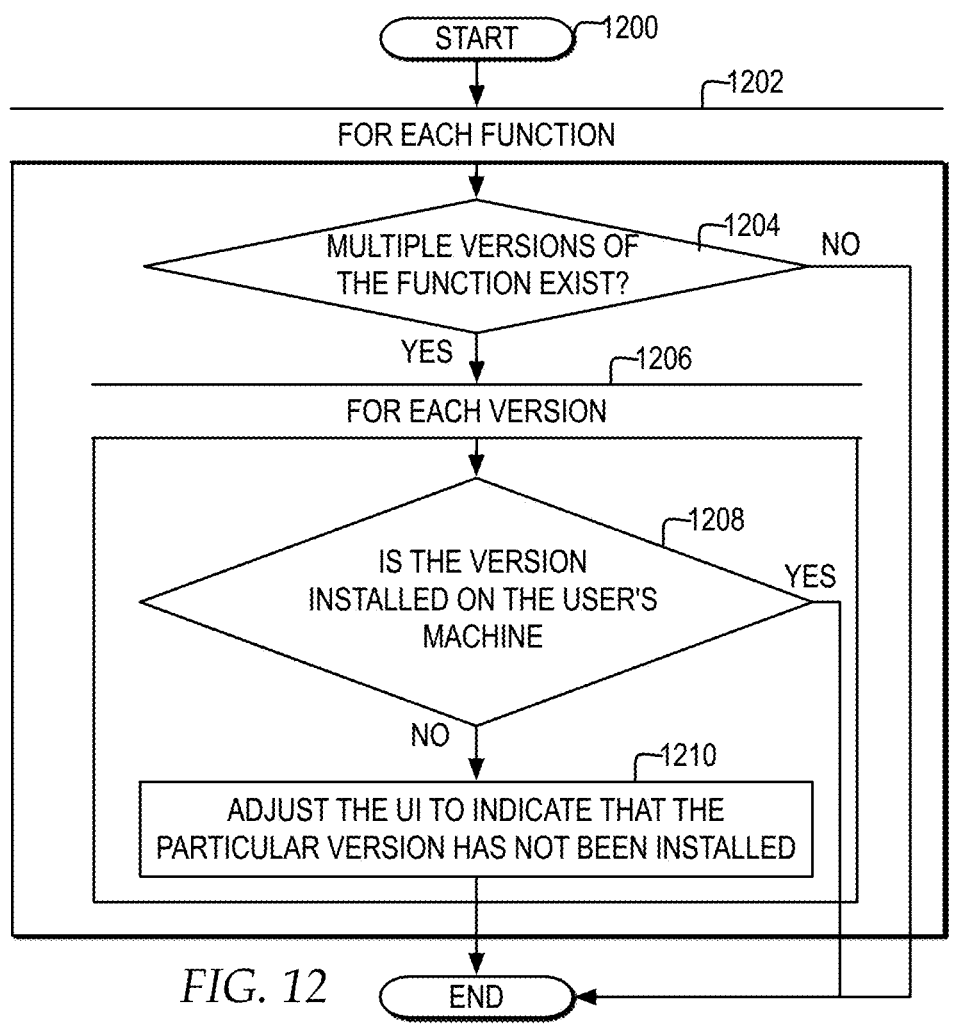
FIG. 12 illustrates a high level logic flowchart of a process and computer program for a tracking service to determine which previous version functions are available to a user and displayed in a UI and to link the previous version functions to executable code.

FIG. 12 illustrates a high level logic flowchart of a process and computer program for a tracking service to determine which previous version functions are available to a user and displayed in a UI and to link the previous version functions to executable code.

In one example, the process and program starts at block 1200 and thereafter proceeds to block 1202. Block 1202 illustrates that the process of block 1204, block 1206, block 1208, and block 1210 may be iteratively performed for each function of an SaaS application. Block 1204 illustrates a determination whether multiple versions of the function exist. At block 1204, if multiple versions of the function do not exist, then the process ends. At block 1204, if multiple versions of the function do exist, then the process passes to block 1206. Block 1206 illustrates that the process of block 1208 and block 1210 may be iteratively performed for each version of the function. Block 1208 illustrates a determination whether the version is installed on the user's machine. At block 1208, if the version is not installed on the user's machine, then the process ends for the version of the function. At block 1208, if the version is installed on the user's machine, then the process passes to block 1210. Block 1210 illustrates adjusting the UI to indicate that the particular version has not been installed, and the process ends for the version of the function.

Figure 13:
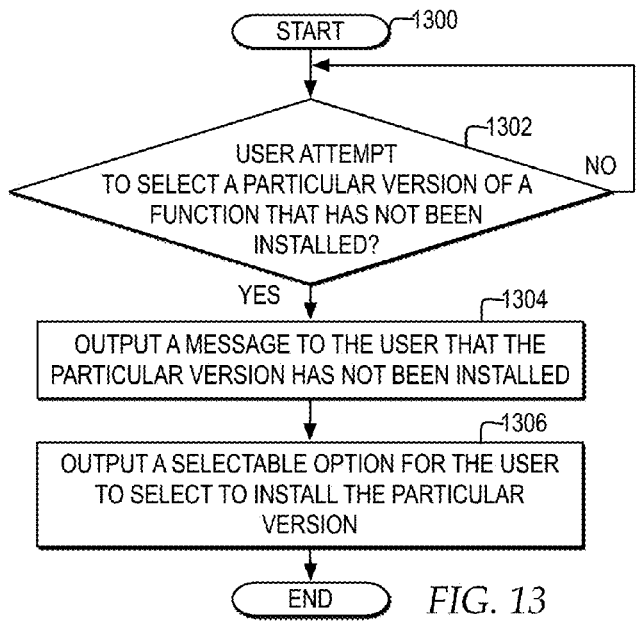
FIG. 13 illustrates a high level logic flowchart of a process and computer program for a tracking service to determine respond to user attempts to access a particular version of a function that is not installed for use by the user.

FIG. 13 illustrates a high level logic flowchart of a process and computer program for a tracking service to determine respond to user attempts to access a particular version of a function that is not installed for use by the user.

In one example, the process and program starts at block 1300 and thereafter proceeds to block 1302. Block 1302 illustrates a determination whether a user attempts to select a particular version of a function that has not been installed. At block 1302, if a user attempts to select a particular version of a function that has not been installed, then the process passes to block 1304. Block 1304 illustrates outputting a message to the user that the particular version has not been installed.

Next, block 1306 illustrates outputting a selectable option for the user to select to install the particular version, and the process ends.

Figure 14:
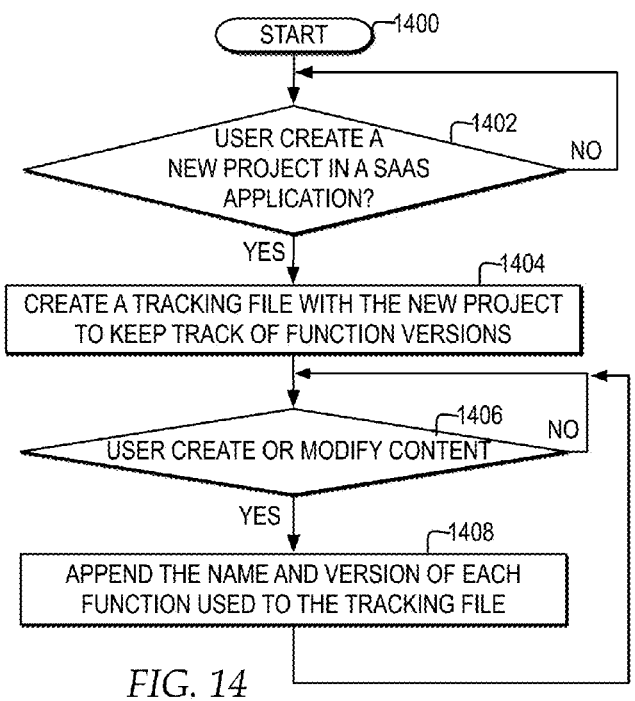
FIG. 14 illustrates a high level logic flowchart of a process and computer program for a tagging service to create a tracking file for a new project and automatically tag and label content, where the tag specifies which function modified particular content.

FIG. 14 illustrates a high level logic flowchart of a process and computer program for a tagging service to create a tracking file for a new project and automatically tag and label content, where the tag specifies which function modified particular content.

In one example, the process and program starts at block 1400 and thereafter proceeds to block 1402. Block 1402 illustrates a determination whether the user creates a new project in an SaaS application. At block 1402, if a user creates a new project in an SaaS application, then the process passes to block 1404. Block 1404 illustrates creating a tracking file with the new project to keep track of function versions. Next, block 1406 illustrates a determination whether a user creates or modifies content. At block 1406, if a user creates or modifies content, then the process passes to block 1408. Block 1408 illustrates appending the name and version of each function used by creating or modifying the content, to the tracking file, and the process returns to block 1406.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for managing a software product, comprising:
   delivering, using one or more processors, to a single user interface of a thin client, for a software product delivered as a hosted service by a host, a current version of the software product comprising one or more selectable functions of the current version of the software product, wherein the current version of the software product is one version of a plurality of separate versions of the software product;
   for each of the one or more selectable functions of the current version of the software product displayed in the single user interface, determining, using the one or more processors, whether one or more previous versions of the one or more selectable functions are available in one or more previous versions of the software product from among the plurality of separate versions of the software product;
   for each of the one or more selectable functions for which one or more previous versions are available, determining, using the one or more processors, if a user accessing the single user interface is allowed to use each of the one or more previous versions;
   in response to determining the user accessing the single user interface is allowed to use at least one version of the one or more previous versions, updating, using the one or more processors, the single user interface to display at least one selectable previous version function for each of the one or more selectable functions for the at least one version of the one or more previous versions that the user is allowed to use;
   for each of the one or more selectable functions for the at least one version of the one or more previous versions, determining, using the one or more processors, whether each of the at least one of the one or more previous versions is installed for user access at the thin client; and
   in response to determining a particular version of the one or more previous versions is not installed for user access at the thin client, adjusting, using the one or more processors, the single user interface to graphically distinguish a selection of the at least one selectable previous version function for the particular version to indicate that the particular version is not installed from a second selection of the at least one selectable previous version function that is installed; and
   in response to receiving a user selection within the single user interface to access a particular selectable previous version function from among the at least one selectable previous version function, delivering, using the one or more processors, the functionality of the particular selectable previous version function from a particular previous version of the software product within the single user interface for the current version of the software product.

2. The method according to claim 1, wherein updating, using the one or more processors, the single user interface to display at least one selectable previous version function from at least one previous version of the plurality of separate versions of the software product further comprises:
   updating, using the one or more processors, the single user interface to display the at least one selectable previous version function from at least one previous version of the plurality of separate versions of the software product by updating the single user interface to display a first selectable previous version function from among the at least one selectable previous version function for a first type of function that is not displayed within the one or more selectable functions of the current version of the software product, and by updating the single user interface to display a second selectable previous version function from among the at least one selectable previous version function for a second type of function that is also displayed within the one or more selectable functions of the current version of the software product.

3. The method according to claim 1, further comprising:
   in response to receiving the user request within the single user interface to access the particular selectable previous version function, determining, using the one or more processors, at least one parameter required for the functionality of the particular selectable version function;

in response to determining the at least one parameter required for the functionality of the particular selectable version function, determining, using the one or more processors, whether the at least one parameter is programmatically available;

in response to determining the at least one parameter is programmatically available, passing, using the one or more processors, the parameter to the host of the hosted service;

in response to determining the at least one parameter is not programmatically available, prompting, using the one or more processors, a user within the single user interface to designate a location of the at least one parameter; and in response to the user designating the location of the at least one parameter within the single user interface, passing, using the one or more processors, the parameter from the location to the host of the hosted service.

4. The method according to claim 1, further comprising:

for each of the one or more selectable functions of the current version of the software product displayed in the single user interface, determining, using the one or more processors, whether one or more previous versions of the one or more selectable functions are available;

in response to determining one or more previous versions of the one or more selectable functions are available, iteratively determining, for each of the one or more previous versions, using the one or more processors, one or more dependencies of each of the one or more previous versions, where each dependency specifies at least one application asset required for running the one or more previous versions;

determining, using the one or more processors, whether the at least one application asset required for each of the dependencies are available at the thin client; and in response to determining a selection of the at least one application asset required for the one or more of the dependencies are not available at the thin client, prompting, using the one or more processors, the user in the single user interface to download and install at the thin client the selection of the at least one application asset required for the one or more of the dependencies.

5. The method according to claim 1, further comprising:

in response to receiving a user selection within the single user interface to access a particular selectable previous version function from among the at least one selectable previous version function from among the selection of the at least one selectable previous version function for the particular version that is not installed, outputting, using the one or more processors, a message to the user that the particular version has not been installed; and outputting, using the one or more processors, a selectable option for the user to select to install the particular version.

6. The method according to claim 1, further comprising:

in response to a user creating a new project within the single user interface, creating, using the one or more processors, a tracking file for the new project to keep track of which version of each function performs each content change in the new project; and in response to the user requesting to change the content in the new project, appending, using the one or more processors, in the tracking file, a name and version number of each function used for the change to the content in the new project.

7. A system for managing a software product, comprising:

a processor, coupled with a memory, and configured to perform the actions of:

delivering, to a single user interface of a thin client, for a software product delivered as a hosted service by a host, a current version of the software product comprising one or more selectable functions of the current version of the software product, wherein the current version of the software product is one version of a plurality of separate versions of the software product;

for each of the one or more selectable functions of the current version of the software product displayed in the single user interface, determining whether one or more previous versions of the one or more selectable functions are available in one or more previous versions of the software product from among the plurality of separate versions of the software product;

for each of the one or more selectable functions for which one or more previous versions are available, determining if a user accessing the single user interface is allowed to use each of the one or more previous versions;

in response to determining the user accessing the single user interface is allowed to use at least one version of the one or more previous versions, updating the single user interface to display at least one selectable previous version function for each of the one or more selectable functions for the at least one version of the one or more previous versions that the user is allowed to use;

for each of the one or more selectable functions for the at least one version of the one or more previous versions, determining whether each of the at least one of the one or more previous versions is installed for user access at the thin client; and in response to determining a particular version of the one or more previous versions is not installed for user access at the thin client, adjusting the single user interface to graphically distinguish a selection of the at least one selectable previous version function for the particular version to indicate that the particular version is not installed from a second selection of the at least one selectable previous version function that is installed; and in response to receiving a user selection within the single user interface to access a particular selectable previous version function from among the at least one selectable previous version function, delivering the functionality of the particular selectable previous version function from a particular previous version of the software product within the single user interface for the current version of the software product.

8. The system according to claim 7, wherein the processor is further configured to perform the actions of:

updating the single user interface to display the at least one selectable previous version function from at least one previous version of the plurality of separate versions of the software product by updating the single user interface to display a first selectable previous version function from among the at least one selectable previous version function for a first type of function that is not displayed within the one or more selectable functions of the current version of the software product, and by updating the single user interface to display a second selectable previous version function from among the at least one selectable previous version function for a second type of function that is also displayed within the one or more selectable functions of the current version of the software product.

9. The system according to claim 7, wherein the processor is further configured to perform the actions of:

in response to receiving the user request within the single user interface to access the particular selectable previous version function, determining at least one parameter required for the functionality of the particular selectable version function;

in response to determining the at least one parameter required for the functionality of the particular selectable version function, determining whether the at least one parameter is programmatically available;

in response to determining the at least one parameter is programmatically available, passing the parameter to the host of the hosted service;

in response to determining the at least one parameter is not programmatically available, prompting a user within the single user interface to designate a location of the at least one parameter; and in response to the user designating the location of the at least one parameter within the single user interface, passing the parameter from the location to the host of the hosted service.

10. The system according to claim 7, wherein the processor is further configured to perform the actions of:

for each of the one or more selectable functions of the current version of the software product displayed in the single user interface, determining whether one or more previous versions of the one or more selectable functions are available;

in response to determining one or more previous versions of the one or more selectable functions are available, iteratively determining, for each of the one or more previous versions, one or more dependencies of each of the one or more previous versions, where each dependency specifies at least one application asset required for running the one or more previous versions;

determining whether the at least one application asset required for each of the dependencies are available at the thin client; and in response to determining a selection of the at least one application asset required for the one or more of the dependencies are not available at the thin client, prompting the user in the single user interface to download and install at the thin client the selection of the at least one application asset required for the one or more of the dependencies.

11. The system according to claim 7, wherein the processor is further configured to perform the actions of:

in response to receiving a user selection within the single user interface to access a particular selectable previous version function from among the at least one selectable previous version function from among the selection of the at least one selectable previous version function for the particular version that is not installed, outputting a message to the user that the particular version has not been installed; and outputting a selectable option for the user to select to install the particular version.

12. The system according to claim 7, wherein the processor is further configured to perform the actions of:

in response to a user creating a new project within the single user interface, creating a tracking file for the new project to keep track of which version of each function performs each content change in the new project; and in response to the user requesting to change the content in the new project, appending, in the tracking file, a name and version number of each function used for the change to the content in the new project.

13. A computer program product for managing a software product, the computer program product comprising a non-transitory computer readable storage medium having program instructions embodied therewith, the program instructions executable by a processor to cause the processor to:

deliver, to a single user interface of a thin client, for a software product delivered as a hosted service by a host, a current version of the software product comprising one or more selectable functions of the current version of the software product, wherein the current version of the software product is one version of a plurality of separate versions of the software product;

for each of the one or more selectable functions of the current version of the software product displayed in the single user interface, determine whether one or more previous versions of the one or more selectable functions are available in one or more previous versions of the software product from among the plurality of separate versions of the software product;

for each of the one or more selectable functions for which one or more previous versions are available, determine if a user accessing the single user interface is allowed to use each of the one or more previous versions;

in response to determining the user accessing the single user interface is allowed to use at least one version of the one or more previous versions, update the single user interface to display at least one selectable previous version function for each of the one or more selectable functions for the at least one version of the one or more previous versions that the user is allowed to use;

for each of the one or more selectable functions for the at least one version of the one or more previous versions, determine whether each of the at least one of the one or more previous versions is installed for user access at the thin client; and in response to determining a particular version of the one or more previous versions is not installed for user access at the thin client, adjust the single user interface to graphically distinguish a selection of the at least one selectable previous version function for the particular version to indicate that the particular version is not installed from a second selection of the at least one selectable previous version function that is installed; and in response to receiving a user selection within the single user interface to access a particular selectable previous version function from among the at least one selectable previous version function, deliver the functionality of the particular selectable previous version function from a particular previous version of the software product within the single user interface for the current version of the software product.

14. The computer program product according to claim 13, further comprising the program instructions executable by a processor to cause the processor to:

update the single user interface to display the at least one selectable previous version function from at least one previous version of the plurality of separate versions of the software product by updating the single user interface to display a first selectable previous version function from among the at least one selectable previous version function for a first type of function that is not displayed within the one or more selectable functions of the current version of the software product, and by updating the single user interface to display a second selectable previous version function from among the at least one selectable previous version function for a second type of function that is also displayed within the one or more selectable functions of the current version of the software product.

15. The computer program product according to claim 13, further comprising the program instructions executable by a processor to cause the processor to:
- in response to receiving the user request within the single user interface to access the particular selectable previous version function, determining at least one parameter required for the functionality of the particular selectable version function;
- in response to determining the at least one parameter required for the functionality of the particular selectable version function, determining whether the at least one parameter is programmatically available;
- in response to determining the at least one parameter is programmatically available, passing the parameter to the host of the hosted service;
- in response to determining the at least one parameter is not programmatically available, prompting a user within the single user interface to designate a location of the at least one parameter; and
- in response to the user designating the location of the at least one parameter within the single user interface, passing the parameter from the location to the host of the hosted service.

16. The computer program product according to claim 13, further comprising the program instructions executable by a processor to cause the processor to:
- for each of the one or more selectable functions of the current version of the software product displayed in the single user interface, determining whether one or more previous versions of the one or more selectable functions are available;
- in response to determining one or more previous versions of the one or more selectable functions are available, iteratively determining, for each of the one or more previous versions, one or more dependencies of each of the one or more previous versions, where each dependency specifies at least one application asset required for running the one or more previous versions;
- determining whether the at least one application asset required for each of the dependencies are available at the thin client; and
- in response to determining a selection of the at least one application asset required for the one or more of the dependencies are not available at the thin client, prompting the user in the single user interface to download and install at the thin client the selection of the at least one application asset required for the one or more of the dependencies.

17. The computer program product according to claim 13, further comprising the program instructions executable by a processor to cause the processor to:
- in response to receiving a user selection within the single user interface to access a particular selectable previous version function from among the at least one selectable previous version function from among the selection of the at least one selectable previous version function for the particular version that is not installed, outputting a message to the user that the particular version has not been installed; and
- outputting a selectable option for the user to select to install the particular version.

\* \* \* \* \*